United States Patent [19]
Kretschmer, Jr.

[11] Patent Number: 5,463,399
[45] Date of Patent: Oct. 31, 1995

[54] MTI USING A POLYPHASE CODE

[75] Inventor: Frank F. Kretschmer, Jr., Laurel, Md.

[73] Assignee: The United States of America as represented by the Secretary of the Navy, Washington, D.C.

[21] Appl. No.: 463,221

[22] Filed: Jan. 28, 1983

[51] Int. Cl.$^6$ ............................ G01S 13/28; G01S 13/524
[52] U.S. Cl. ................................. 342/132; 342/160
[58] Field of Search .................. 343/27.2 PC, 7.7; 342/132, 160

[56] References Cited

U.S. PATENT DOCUMENTS

| | | | |
|---|---|---|---|
| 3,225,349 | 12/1965 | Thor | 343/7.7 |
| 3,808,594 | 4/1974 | Cook et al. | 343/17.2 R |
| 3,905,033 | 9/1975 | Moore et al. | 343/7.7 |
| 4,096,478 | 6/1978 | Chavez | 343/7.7 |
| 4,241,347 | 12/1980 | Albanese et al. | 343/9 R |

OTHER PUBLICATIONS

Lewis et al, *A New Class of Polyphase Pulse Compression Codes and Techniques*, IEEE Trans, on Aerospace and Electronic Systems, vol. AES-17 No. 3, May 1981, pp. 364–371.

Kretschmer et al, *Polyphase Pulse Compression Waveforms*, NRL Report 8540 Jan./1982, pp. 1–21.

*Primary Examiner*—Gilberto Barron, Jr.
*Attorney, Agent, or Firm*—Thomas E. McDonnell

[57] ABSTRACT

An improved MTI radar system including a signal expander/compressor for providing palindromic P2 phase-coded upswept and downswept expanded signals that are alternately transmitted by a radar transmitter. The echos from the upswept and downswept signals are received by a receiver, compressed in the signal expander/compressor and inputted to an MTI subtractor. Since the autocorrelation sidelobes of the palindromic phase coded echos are real, the echos from stationary clutter are completely cancelled so that the system is capable of detecting weak echos from moving targets.

9 Claims, 5 Drawing Sheets

FIG. 8

MTI USING A POLYPHASE CODE

BACKGROUND OF THE INVENTION

This invention relates to a moving target indicating radar system (MTI) and more particularly to an MTI with no blind speeds capable of detecting weak echos from moving targets in the presence of distributed clutter.

MTI systems are well-known in the prior art, but a major problem has been the insensitivity of these systems to targets moving at blind speeds. A target moving at a blind speed will move toward or away from the MTI system an integral number of half wavelengths of the transmitted radio frequency beam from the MTI during the interval between transmitted pulses.

One method of eliminating blind speeds, disclosed in U.S. Pat. No. 3,225,349 by Thor, utilized expanded transmitted signals that are linearly frequency modulated. A first pulse with a linearly increasing frequency (the upswept pulse) is followed by a second pulse with a linearly decreasing frequency (the downswept pulse). The upswept and downswept pulse are generated by applying a drive pulse to an appropriate filter.

The echos of the upswept and downswept signals from targets are received and channeled through matched filters. These matched filters compress the upswept and downswept pulses so that accurate timing measurements are possible.

The received pulses are coherently or non-coherently subtracted so that echos from non-moving targets are cancelled. However, echos from moving targets have compressed pulses that are displaced slightly in time from a compressed pulse from a non-moving target due to range doppler coupling. The sign of this time displacement is dependent upon whether the echo is the reflection of an upswept or a downswept pulse.

Thus, due to range doppler coupling, the echos from a moving target of successive upswept and downswept signals will not cancel in the subtractor. Therefore, only moving targets will be detected.

The sensitivity of the above-described MTI may be increased by utilizing polyphase coded expanded output pulses since the corresponding compressed pulses have lower sidelobes than linear pulses. However, one problem with using these polyphase coded pulses is that the auto-correlation sidelobes of the pulses have complex values. As described below, the sidelobes of the echos from distributed clutter will not cancel in the MTI subtractor if the sidelobes have unequal complex values. Therefore, weak echos reflected from moving targets may be masked by these uncancelled sidelobes from clutter thereby decreasing the sensitivity of the MTI radar system.

OBJECT OF THE INVENTION

Accordingly, it is an object of the invention to provide a new and improved high sensitivity MTI radar system utilizing polyphase coded transmitted signals.

It is a further object of the inventon to obviate the masking of weak echos from moving targets by the sidelobes of echos from non-moving distributed clutter.

It is still a further object of the invention to provide for the complete cancellation of clutter sidelobes in the MTI subtractor.

SUMMARY OF THE INVENTION

The above and other objects are achieved in the present invention which comprises an improved MTI radar system for detecting weak echos from moving targets in a stationary clutter background. The system alternately transmits upswept and downswept phase code expanded signals alternately receives and compresses the echos from the upswept and downswept transmitted signals and subtracts the envelope functions of the received pulses. Generally, palindromic doppler tolerant polyphase codes may be utilized so that the auto-correlation sidelobes of the received echos are real for both the transmitted upswept and downswept signals. Since these sidelobes are real, the clutter signals are completely cancelled in the subtractor, thereby enabling the detection of weak echos from moving targets. In a preferred embodiment a P-2 polyphse code is utilized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a is a graph of a typical expanded polyphase coded upswept expanded pulse.

FIG. 1b is a graph of a downswept pulse with same polyphase code as the pulse depicted in FIG. 1a.

FIG. 5d is a graph of amplitude of the sum of pulses depicted in FIGS. 5a, 5b and 5c. (Note that FIGS. 2–5 do not depict actual compressed waveforms resulting from the pulses depicted in FIG. 1 but only serve as model pulses to illustrate the principles of the invention).

DETAILED DESCRIPTION OF THE PREFERRED EMBODIMENT

Briefly, the invention provides an MTI system for detecting weak signals from moving targets in a clutter background by completly cancelling the clutter.

The subject invention may be better understood by first discussing polyphase coding techniques, the effects of range doppler coupling on echos from a moving target, and the amplitude variations caused by the combining of complex sidelobes of echos reflected from clutter.

Referring now to the drawings, wherein like reference numerals designate identical or corresponding parts throughout the several views, and more particularly to FIG.

Figures 1A, 1B:
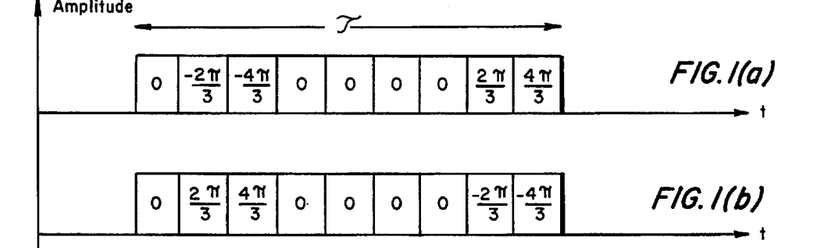

1 thereof, a typical polyphase coded expanded pulse is depicted. FIG. 1a depicts an upswept pulse and FIG. 1b depicts a downswept pulse. A pulse of length τ is divided into nine segments. The numbers in the segments are phase shifts impressed on a carrier wave. As is well-known in the art, if the carrier is represented by the complex function $$V(t) = A_1 e^{iwt} \quad (1)$$

then the phase of the carrier may be shifted by an arbitrary phase difference, φ, by multiplying V(t) by the complex function F(φ), i.e.

$$V(t,\phi) = V(t)F(\phi) \quad (2)$$

where $$F(\phi) = A_2 e^{i\phi} = A_2 \cos\phi + i A_2 \sin\phi = I + iQ \quad (3)$$

The real part of a complex function is denoted I (inphase component) and the imaginary part is denoted Q (quadrature component).

The F(φ)s required to form the pulse depicted in FIG. 1a and the complex multiplication of eq. 2 may be performed by means well known in the art. By way of example, a digital phase shifter with inputs including V(t) and F(φ) may be utilized. Note that the downswept pulse depicted in FIG. 1b may be formed by multiplying V(t) by the complex conjugate of the F(φ)s utilized to form the upswept pulse.

Figure 2:
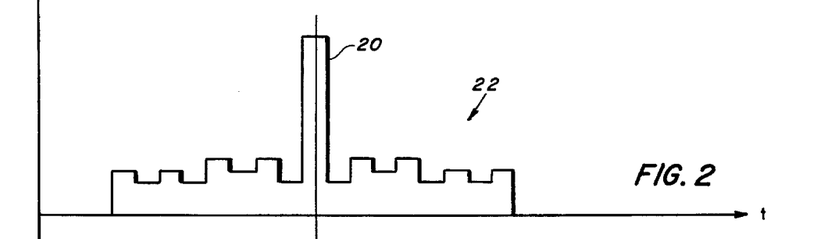
FIG. 2 is a graph of a compressed echo from a non-moving target.

FIG. 2 depicts the amplitude, R (t), as a function of time, of a compressed pulse of an echo from a stationary target. Referring now to FIG. 2, the compressed pulse is characterized by a peak 20 and sidelobes 22. It is the time that the peak is formed that is utilized for range determination. Note that, in general, the sidelobes 22 are complex quantitites and that amplitude of a sidelobe at a given time, $t_o$, is given by $$|R(t)| = [I(t_o)^2 + Q(t_o)^2]^{1/2}$$

While the phase is given by—phase R(t)=arc tan (Q/I)

Also, although the amplitudes of the sidelobes are equal for upswept and downswept echos, the actual complex components, I and Q, of the sidelobes are not equal, i.e., in general $$[I_{up}^2 + Q_{up}^2]^{1/2} = [I_{down}^2 + Q_{down}^2]^{1/2}$$

but $$I_{up} \neq I_{down}$$

and $$Q_{up} \neq Q_{down}$$

where $I_{up}$ and $I_{down}$ are the real parts of the received compressed pulses, respectively and $Q_{up}$ and $Q_{down}$ are the imaginary parts.

Figure 3A:
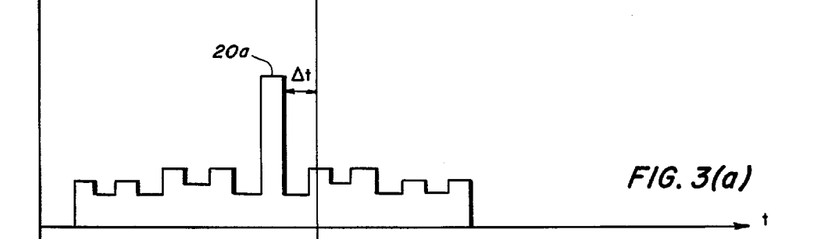
FIGS. 3a and 3b are graphs of the compressed echos of an upswept and downswept pulse reflected from a moving target. The peaks are displaced due to range doppler coupling from the peak of compressed pulse depicted in FIG. 2.
Figure 3B:
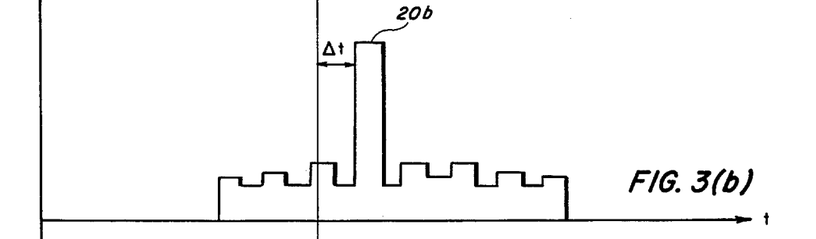

The range doppler effect which allows the detection of moving target may be visualized by referring to FIGS. 3a and 3b depicting compressed pulses for an upswept and downswept pulse, respectively, reflected from a target moving with non-zero radial velocity relative to the MTI. Note that the peaks 20a, 20b are shifted in time, relative to the peak 20 for a non-moving target as depicted in FIG. 2, by a time Δt due to range doppler coupling. This shift is in opposite directions for the upswept pulse, FIG. 3a, and the downswept pulse, FIG. 3b. The sign of Δt is dependent upon the direction of the radial velocity of the target. It is this range doppler coupling that prevents the cancellation of echos from moving targets in the MTI described below.

Figure 3C:
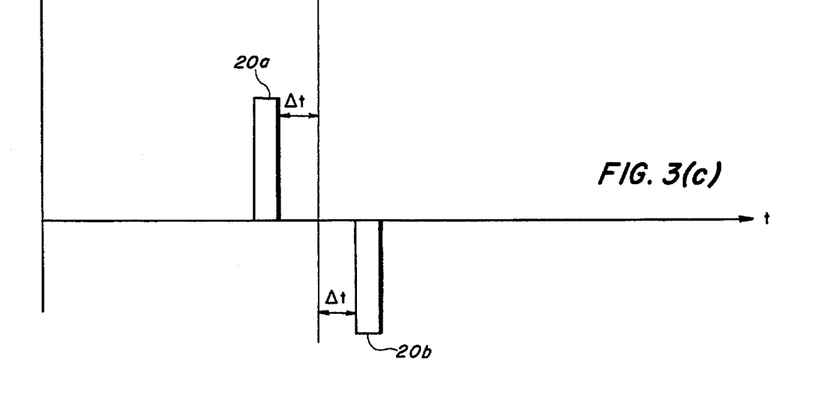
FIG. 3c is a graph of the pulses depicted in FIGS. 3a and 3b after subtraction.

FIG. 3c depicts the results of subtracting the doppler shifted pulses. Note that the shifted peaks do not cancel. The actual range of the moving target corresponds to the midpoint between the doppler shifted peaks 20a and 20b.

Figure 4A:
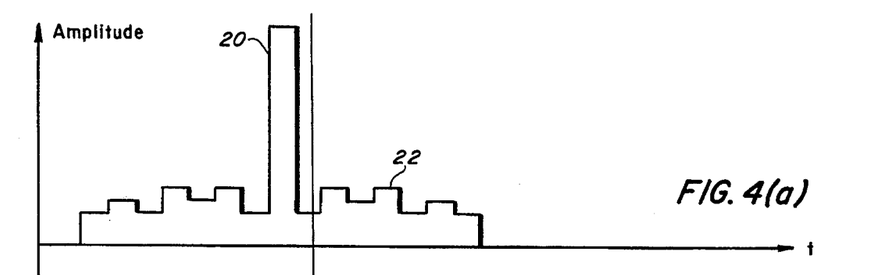
FIGS. 4a, 4b, and 4c are graphs depicting upswept compressed echos from clutter where the sidelobes of the echos overlap in time.
Figure 4B:
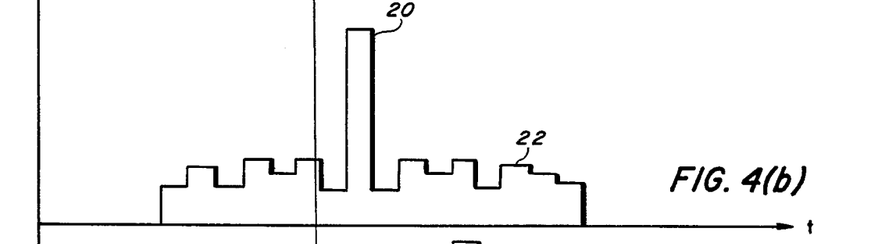
Figure 4C:
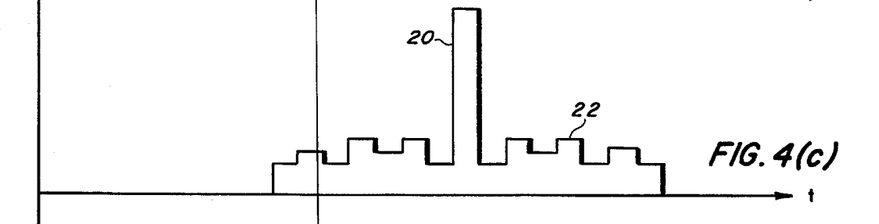
Figure 4D:
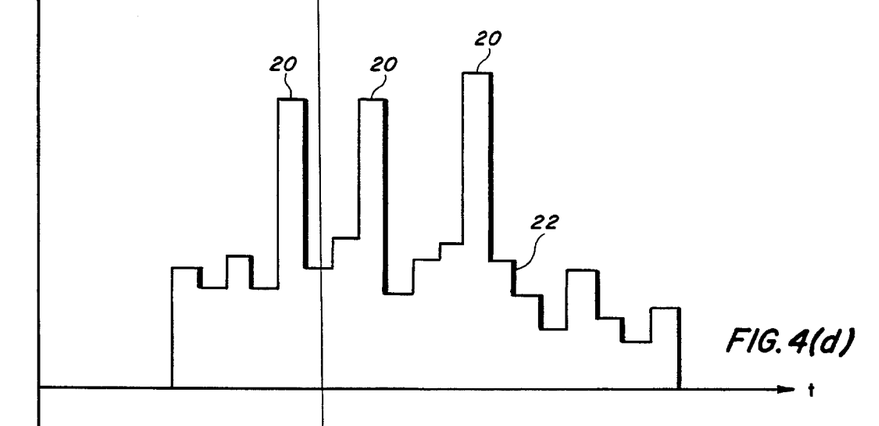
FIG. 4d is a graph of the amplitude of the sum of the pulses depicted in FIGS. 4a, 4b and 4c.

The problems with cancelling convolved echos from distributed clutter are illustrated by FIGS. 4a–4c depicting the amplitudes of a series of overlapping upswept signals reflected from stationary clutter and by FIG. 4d depicting the amplitude of the combined pulse corresponding to the output of an envelope detector. FIG. 5a–5d depict downswept echos from the same stationary targets. Note that the waveforms depicted in FIGS. 4 and 5 have been arbitrarily chosen to illustrate the principles of the invention.

Referring now to FIGS. 4a–4d, FIG. 4a depicts the amplitude waveform of a single echo from a non-moving target. FIGS. 4b and 4c depict similar amplitude waveforms of echos from other non-moving targets at different ranges. Therefore, the peaks of waveforms are displaced in time. Since the sidelobes of these amplitude waveforms overlap in time, the output of an envelope detector is the amplitude of the sum of complex sidelobes of the individual clutter signals depicted in FIGS. 4a–4c. This envelope detector output is depicted in FIG. 4d. Thus, the output of the detector is the amplitude of the sum of the complex sidelobes. As will be described more fully below the amplitude of this sum is not the sum of the amplitudes of the individual echos.

Referring now to FIGS. 5a–5d, the individual echos of the downswept signal echos from same stationary targets have the same amplitude waveform as those from the upswept signal depicted in FIGS. 4a–4c. However, the phases of the pulses are not equal. Thus, the amplitude of the combined downswept pulses depicted in FIG. 5d does not equal the amplitude of the combined upswept pulse depicted in FIG. 4d. It is this inequality of detector output that prevents the cancellation of convolved echos from distributed clutter in a prior art MTI utilizing polyphase coded transmitted signal.

The effects described above are illustrated by Table I. In columns 1 and 2 the I and Q value, at time $t_o$, of each of the signals depicted in FIG. 4 and 5 are set forth. In column 3 the amplitude of each signal, $[I^2+Q^2]^{1/2}$, is set forth, while in column 4 the sum of the amplitude of the signals in FIG. 4a, 4b, and 4c and the sum of the signals in FIGS. 5a, 5b and 5c are set forth.

Figure 5A:
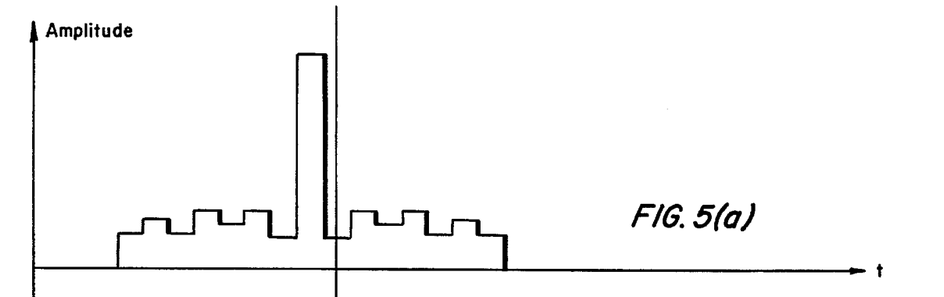
FIGS. 5a, 5b and 5c are graphs depicting downswept, compressed echos from clutter where the sidelobes of the clutter overlap in time.
Figure 5B:
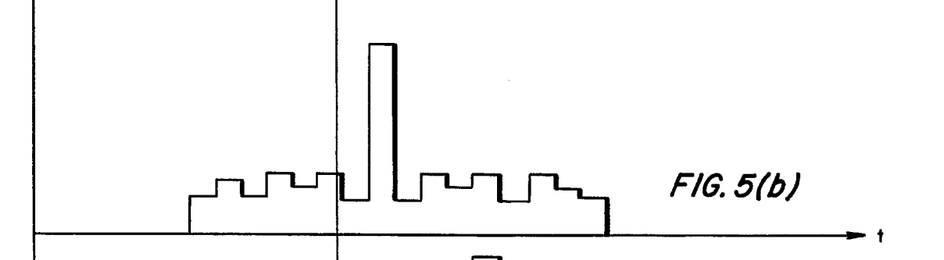
Figure 5C:
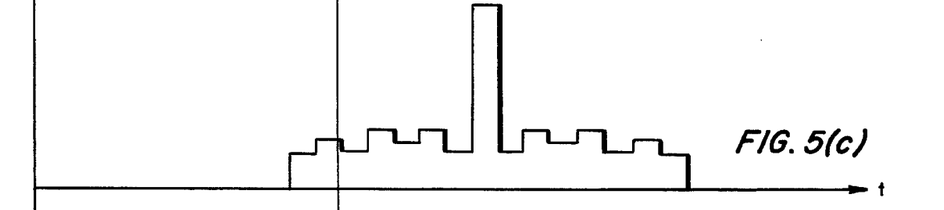
Figure 5D:
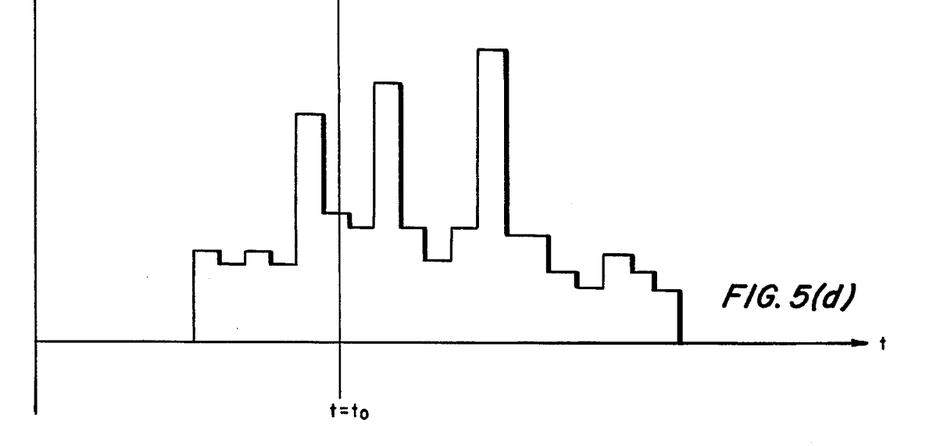

As described above, the amplitudes of the individual echo signals depicted in FIGS. 4a, 4b and 4c are the same as the signals depicted in FIGS. 5a, 5b and 5c respectively. However, the I and Q values of each individual echo signal are not equal. This, $I_0$, $Q_0$ and $[I_0^2+Q_0^2]^{1/2}$ for the upswept combined signal, FIG. 4d, are not equal to $I_0$, $Q_0$ and $[I_0^2+Q_0^2]^{1/2}$ for the combined downswept signal, FIG. 5d. Note also that the amplitude of the combined signal is not equal to the sum of the amplitudes of the individual echo signals. It is this amplitude of the combined signals that is the output of an envelope detector, thus, the combined signals do not cancel in the subtractor.

TABLE I

| FIG. | 1<br>I | 2<br>Q | 3<br>$[I_0^2 + Q_0^2]^{1/2}$ | 4<br>$\Sigma[I_0^2 + Q_0^2]^{1/2}$ |
|---|---|---|---|---|
| 4a | 1 | 0 | 1 | |
| 4b | 1 | 2 | $\sqrt{5} = 2.24$ | 4.65 |
| 4c | 1 | 1 | $\sqrt{2} = 1.41$ | |

TABLE I-continued

| FIG. | 1<br>I | 2<br>Q | 3<br>$[I_0^2 + Q_0^2]^{1/2}$ | 4<br>$\Sigma[I_0^2 + Q_0^2]^{1/2}$ |
|---|---|---|---|---|
| 4d | 3 | 3 | $\sqrt{18} = 4.24$ | |
| 5a | 0 | 1 | 1 | |
| 5b | 1 | 2 | $\sqrt{5} = 2.24$ | 4.65 |
| 5c | 1 | 1 | $\sqrt{2} = 1.41$ | |
| 5d | 2 | 4 | $\sqrt{20} = 4.47$ | |

Figure 6:
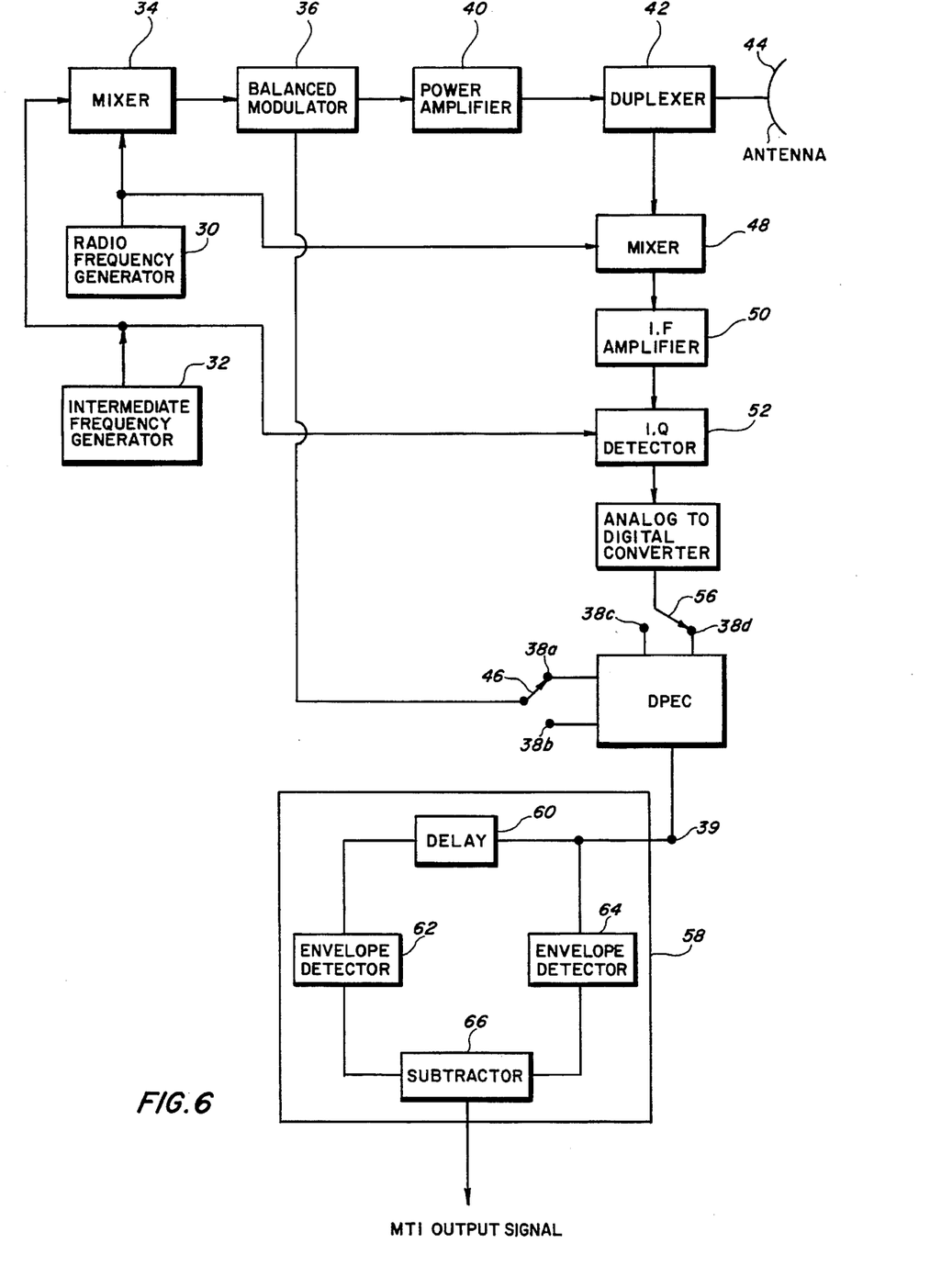
FIG. 6 is a block diagram of an embodiment of the invention.

A block diagram of a preferred embodiment of the present invention is set forth in FIG. 6. The outputs of an rf frequency generator 30 and an intermediate frequency generator 32 are routed to a mixer 34. The mixer output signal is routed to a first input of a balanced modulator 36. The balanced modulator also includes a second input for receiving the phase codes, F(φ) from a digital pulse expander/compressor (DPEC) 38. This DPEC is described more fully below with reference to FIG. 7. The output from the balanced modulator is then routed through a power amplifier 40, a duplexer 42 and to an antenna 44 for transmission.

The transmitted signals are of length τ with an interpulse delay of length T where T is the time difference measured from the leading edge of successive signals. A first switch 46 between the balanced modulator 36 and the DPEC 38 alternately interconnects the balanced modulator with a first output 38a and a second output 38b of the DPEC 38. The first output signal is the polyphase code for an upswept signal while the second output signal is the polyphase code for a downswept signal i.e., the complex conjugate of the first output signal. The switch 46 alternates between said first and second outputs so that the transmitted signals from the antenna are alternately upswept and downswept expanded polyphase coded signals.

The echos from moving and non-moving targets are received by the antenna 44. These received signals are converted to the I.F. frequency in a second mixer 48 and amplified by a second I.F. amplifier 50.

The signal from the I.F. amplifier 50 is routed to an I, Q detector 52 for coherent detection in accordance with the reference I.F. signal from I.F. generator 32. The output from the I and Q detector 52 represent the inphase and quadrature components of the received signal. The components are digitized by an A/D convertor 54 and routed to the first and second inputs 38c, 38d of the DPEC 38 by a second switch 56. The first input 38c routes the received signal through a matched filter for an upswept signal while the second input 38d routes the signal through a matched filter for a downswept signal where both matched filters are included in the DPEC 38. These matched filters are described below in relation to FIGS. 7 and 8.

The second switch 56 is synchronized so that the echos from an upswept pulse are routed to the first input and the echos from a downswept pulse are routed to the second input. Means for achieving this synchronization are well-known in the art and are not part of the present invention. For example, a clock signal generated by a crystal oscillator could be used to synchronize the system components.

The compressed output pulses from the DPEC 38 are routed to the input of a non-coherent subtractor 58 from a third DPEC output 39. The non-coherent subtractor includes a delay 60 for delaying a signal for the time period T, a first envelope detector 62 interconnected with the delay input a second envelope detector 64 interconnected with the delay output, and a subtractor 66 with input signals including the output signals from the detectors 62 and 64 and with an MTI output signal equal to the difference between the amplitudes of the input signals.

At any given timer e.g., $t_o$, the inputs to the first and second detectors are the upswept and downswept echos from the same targets due to the induced delay T. Thus individual pulses from clutter will cancel completely in the subtractor. The peaks from echos reflected by moving targets will not cancel since the peaks are shifted due to range doppler coupling. Unfortunately, echos from combined clutter will generally not cancel for the reason set forth in the discussion of Table 1.

Cancellation of combined clutter echos is achieved in the present invention by utilizing a DPEC that generates a P2 polyphase code. This code and means for generating it are described in the article by Lewis and Kretschmer entitled "A New Class of Polyphase Pulse Compression Codes and Techniques", IEEE Transactions on Aerospace and Electronic Systems, Vol. AES-17, No. 3, p. 364, May, 1981, and in their U.S. patent application Ser. No. 377,108. These documents are hereby incorporated by reference.

Briefly, the P-2 polyphase code is similar to Butler matrix steering phases used in antennas to form orthogonal beams. The ith element of the jth group of the p-2 code is given by the formula $$\phi_{i,j} = \{(\pi/2)[(N-1)/N-(\pi/N)]-(\pi/N)(i-j)\} [N+1-2j]$$

where i, j=1, ..., N and N is an even integer. The code sequence is determined by forming a matrix with each row comprising one group of element, as illustrated in Table II. The code is then determined by reading the matrix of Table II from left to right while progressing from the top row to the bottom row. Note that there are $N^2$ elements.

TABLE II

| | i = 1 | i = 2 | | i = N |
|---|---|---|---|---|
| j = 1 | $\phi_{1,1}$ | $\phi_{1,2}$ | ... | $\phi_{1,N}$ |
| j = 2 | $\phi_{2,1}$ | $\phi_{2,2}$ | ... | $\phi_{2,N}$ |
| . | . | . | | . |
| . | . | . | | . |
| . | . | . | | . |
| j = N | $\phi_{N,1}$ | $\phi_{N,2}$ | ... | $\phi_{N,N}$ |

These P-2 code elements may be generated for example, by a digital circuit including clocked shift registers and a fast Fourier transform circuit (FFT). Such a circuit is described below in relation to FIG. 7.

As is set forth in these references, the P2 code is palindromic i.e., it is the same when read backwards as forwards. The autocorrelation sidelobes of the P2, or any palindromic code, are real. As is obvious from Table 1, for Q=0 the amplitudes of the upswept and downswept combined signals of individual echo signals with real sidelobes would be equal. Therefore, combined clutter echo signals will be completely cancelled in the present invention. This clutter cancellation allows the detection of low amplitude moving target echos while providing the advantages of polyphase coding described in the above-incorporated references.

Figure 7:
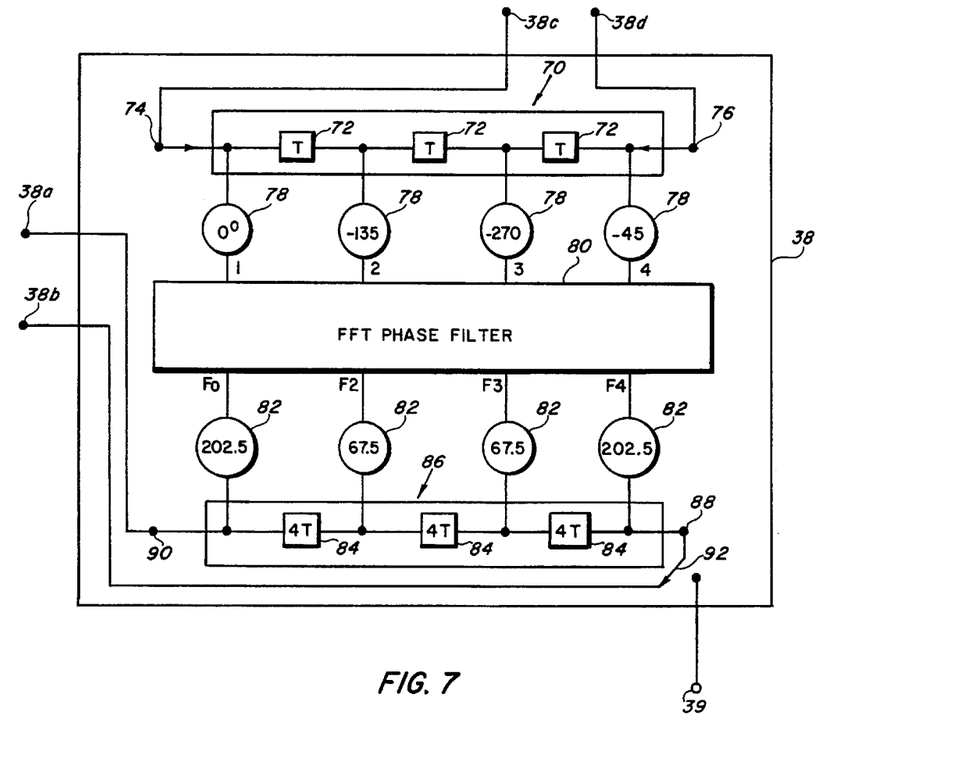
FIG. 7 is a schematic diagram of a digital pulse expander/compressor (DPEC).

FIG. 7 depicts a digital matched filter 68 forming the first and second matched filters of the DPEC 38. Referring now to FIG. 7, an input shift register 70 with three delay elements 72 has a first and a second input terminal 74, 76 for accepting the upswept and downswept received signals respectively. The delay elements are clocked to delay a delay element input signal by a delay timer $T_D$. The first and second inputs 74, 76 of the digital matched filter 68 are connected to the first and second inputs 38c, 38d, respectively, of the DPEC 38

The output signal from each delay element 72 is routed through a first phase shifter 78 and accepted by the inputs of an FFT phase filter 80. The FFT output signals are routed through a second phase shifter 82 and accepted by the output delay elements 84 of an output shift register. These output delay elements are clocked to delay an input signal by $T_D$, or a multiple thereof. This output shift register includes a first output terminal 88 with an output signal that is the compressed pulse corresponding to the received upswept and downswept signals. The first output terminal also transmits the downswept expanded signal while the upswept expanded signal is transmitted from a second output terminal 90 of the output shift register 86.

Since the first output 88 provides both the compressed pulses and the downswept expanded output signal, a third switch 92 is utilized to interconnect the first output of the digital filter 38 with the second and third outputs 38b and 39 of the DPEC 38. This switch 92 is synchronized so that the downswept signal is directed to the second DPEC output 38b and the compressed pulse is directed to the third DPEC output 39. The second digital filter output 90 is connected to the first DPEC output 38a.

Figure 8:
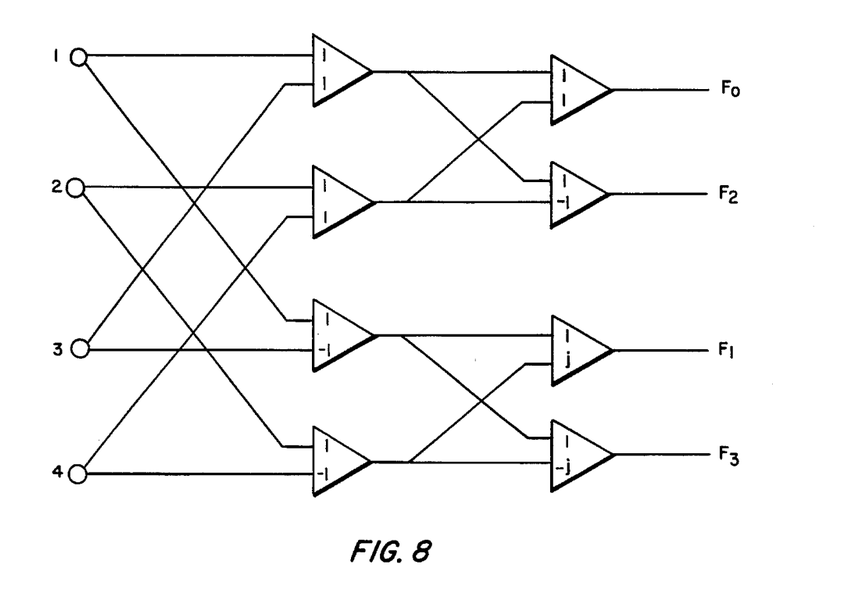
FIG. 8 is a schematic diagram of the FFT butterflies utilized in the DPEC depicted in FIG. 7.

The numerals inside the phase shifters are the magnitudes of the required phase shifts in degrees. The FFT butterflies utilized in the FFT phase shifter of FIG. 7 are depicted in FIG. 8.

An FFT with four inputs and four outputs is depicted in FIG. 7 by way of example not by way of limitation. In general N inputs and outputs may be utilized. Alternative embodiments of a P2 DPEC would be obvious to one skilled in the art.

Although the embodiment described above utilized a P2 code the principles of the invention may be practiced utilizing any phase code with real autocorrelation sidelobes. Additionally, the non-coherent subtractor depicted in FIG. 6 may be replaced by a coherent subtractor.

Obviously many other modifications and variations of the present invention are possible in light of the above teachings. It is therefore to be understood that within the scope of the appended claims the invention may be practiced otherwise than as specifically described.

What is claimed and desired to be secured by Letters Patent of the United states is:

1. An MTI for detecting moving targets in a clutter background comprising:

means for generating a palindromic polyphase coded upswept expanded signal and a palindromic polyphase coded downswept expanded signal;

means for alternately transmitting said upswept and downswept signals;

means for receiving the upswept and downswept echos of said transmitted upswept and downswept signals reflected from moving and non-moving targets;

means for switching said upswept echos into the input of a first matched filter for compressing the echos into a first compressed pulse;

means for switching said downswept echos into a second matched filter for compressing the echos into a second compressed pulse where said polyphase expanded first and second compressed pulses are of the type with real autocorrelation sidelobes; and means for subtracting said first and second compressed pulses to cancel echos from non-moving targets and to provide an MTI output signal encoding the range of moving targets.

2. An MTI radar system comprising:

signal compression/expansion means including a first matched filter for providing a first output P2 polyphase expanded upswept signal and for compressing a first input P2 polyphase expanded upswept signal into a first compressed pulse and further including a second matched filter for providing a second output P2 polyphase coded expanded downswept signal and for compressing a second input P2 polyphase coded downswept signal into a second compressed pulse where the autocorrelation sidelobes of said first and second compressed pulses are real, where the $N^2$ elements of said P2 code are determined by the formula $$\phi_{i,j} = \{(\pi/2)[(N-1)/N - (\pi/N)(i-j)][N+1-2j]\}$$

where i, j=1, ... N and N is an even integer;

transmitting means for alternately transmitting a first transmitted signal corresponding to said first output expanded upswept signal and for transmitting a second transmitted pulse corresponding to said second output expanded downswept signal, receiving means for receiving the echos of said transmitted signals where a first received signal includes the echos of said first transmitted signal and a second received signal includes the echos of the second transmitted signal;

switching means, interconnecting said receiver with said signal expansion/compression means, for alternately switching said first and second received signals between the inputs of said first and second matched filters respectively wherein said transmitter and said switching means are synchronized so that said first received signal is provided to the input of said first matched filter and said second received signal is provided to the input of said second matched filter; and detecting means, with input signals including said first and second compressed pulses from said signal expansion/compression means, for cancelling said compressed received signal corresponding to echos from non-moving targets and for providing an MTI output signal encoding the range of a moving target.

3. The MTI recited in claim 2 wherein:

said first and second matched filter are realized in a digital circuit with inputs for accepting said first and second received signals and output for providing said first and second P2 expanded output signals and for providing said first and second compressed pulses.

4. The MTI recited in claim 3 wherein said detection means is a non-coherent subtractor comprising:

a first subtractor input, where said first subtractor input signals are said alternating first and second compressed pulses from said signal expansion/compression means;

delay means connected to said first input, said delay means with a delay output where the delay output signal is equal to the first subtractor input signal delayed by T seconds where T is the interpulse delay, first envelope detector means connected with said first subtractor input, for providing a third output signal encoding the amplitude of said first subtractor input signal;

second envelope detector means for providing a fourth output signal encoding the amplitude of said delay output signal; and subtraction means for providing an MTI output signal equal to the difference of said third and fourth output signals.

5. An MTI radar system comprising:

signal compression/expansion means including a first matched filter for providing a first output palindromic polyphase expanded upswept signal and for compressing a first input polyphase expanded upswept signal into a first compressed pulse and further including a second matched filter for providing a second output palindromic polyphase coded expanded downswept signal and for compressing a second input polyphase coded downswept signal into a second compressed pulse where the autocorrelation sidelobes of said first and second compressed pulses are real;

transmitting means for alternately transmitting a first transmitted signal corresponding to said first output expanded upswept signal and for transmitting a second transmitted pulse corresponding to said second output expanded downswept signal;

receiving means for receiving the echos of said transmitted signals where a first received signal includes the echos of said first transmitted signal and a second received signal includes the echos of the second transmitted signal;

switching means, interconnecting said receiver with said signal expansion/compression means, for alternately switching said first and second received signals between the inputs of said first and second matched filters respectively wherein said transmitter and said switching means are synchronized so that said first received signal is provided to the input of said first matched filter and said second received signal is provided to the input of said second matched filter; and detection means, with input signals including said first and second compressed pulses from said signal expansion/compression means, for cancelling said compressed received signal corresponding to echos from non-moving targets and for providing an MTI output signal encoding the range of a moving target.

6. The MTI recited in claim 5 wherein:

said first and second matched filter are realized in a digital circuit with inputs for accepting said first and second received signals and output for providing said first and second palindromic expanded output signals and for providing said first and second compressed pulses.

7. The MTI recited in claim 6 wherein said detection means is a non-coherent subtractor comprising:

a first subtractor input where said first subtractor input signals are said alternating first and second compressed pulses from said signal expansion/compression means;

delay means connected to said first input, said delay means with a delay output where the delay output signal is equal to the first input signal delayed by T seconds where T is the interpulse delay first envelope detector means connected with said first subtractor input for providing a third output signal encoding the amplitude of said first subtractor input signal;

second envelope detector means for providing a fourth output signal encoding the amplitude of said delay output signal; and subtraction means for providing an MTI output signal equal to the difference of said third and fourth output signals.

8. A method for detecting moving targets in a clutter background utilizing a radar system of the type with a first matched filter for compressing an upswept expanded polyphase coded signal and a second matched filter for compressing a downswept polyphase coded expanded signal, said method comprising the steps of:

generating a palindromic polyphase coded upswept expanded signal and a polyphase coded downswept expanded signal;

alternately transmitting said upswept and downswept signals;

receiving the upswept and downswept echos of said upswept and downswept transmitted signals reflected from moving and non-moving targets;

switching said upswept echos into the input of a first matched filter for compressing the echos into a first compressed pulse;

switching said downswept echos into a second matched filter for compressing the echos into a second compressed pulse where said polyphase expander upswept and downswept signals are of the type with real autocorrelation sidelobes; and subtracting said first and second compressed pulses to cancel echos from non-moving targets and to provide an MTI output signal encoding the range of moving targets.

9. The method recited in claim 8 wherein:

the signals generated are P2 polyphase coded upswept and downswept signals.

* * * * *